United States Patent [19]

Nishimura et al.

[11] 4,087,835
[45] May 2, 1978

[54] PROJECTION TYPE COLOR TELEVISION SYSTEM

[75] Inventors: Itsuro Nishimura; Yoshimasa Takahashi, both of Moriguchi, Japan

[73] Assignee: Sanyo Electric Co., Ltd., Osaka, Japan

[21] Appl. No.: 749,281

[22] Filed: Dec. 10, 1976

[30] Foreign Application Priority Data

Dec. 11, 1975  Japan .............................. 50-148051

[51] Int. Cl.² ............................................. H04N 9/31
[52] U.S. Cl. ...................................................... 358/60
[58] Field of Search ..................... 358/27, 29, 55, 60, 358/61, 62, 74; 315/386

[56] References Cited

U.S. PATENT DOCUMENTS 2,601,328  6/1952  Rosenthal ............................. 358/60

Primary Examiner—Robert L. Richardson
Attorney, Agent, or Firm—Armstrong, Nikaido, Marmelstein & Kubovcik

[57] ABSTRACT

A projection type color television system of the present disclosure comprises three cathode ray tubes each adapted to produce one of three different primary color light beams, a projecting screen and three lens assemblies positioned between the projecting screen and respective cathode ray tubes. The glass faceplate or phosphor screen of the three cathode ray tubes are positioned on an imaginary plane which is in parallel relation to the projecting screen, and principle planes of the three lens assemblies are also position in an another imaginary plane which is in parallel relation to the projecting screen, so that the projected image from any one of cathode ray tubes geometrically overlaps with another projected image from another cathode ray tube. Each cathode ray tube is coupled with a brightness correction circuit for correcting the brightness of the projected image on the projecting screen to be uniform. The projecting screen is formed with two layers for widening the horizontal diffusion and narrowing the vertical diffusion.

9 Claims, 22 Drawing Figures

PROJECTION TYPE COLOR TELEVISION SYSTEM

The present invention relates to a projection type color television system, and more particularly, to an optical system including projecting screen means, three cathode ray tubes for projecting color light beams onto said projecting screen means through respective lens assembly, and circuit means coupled to each cathode ray tubes for adjusting the light beams projected onto said projecting screen means to uniform the luminance or brightness of the color picture when perceived with the naked eyes.

The practical limit for a direct-view tube type television system is a phosphor screen size of about 30 inches. For large pictures, it is necessary to use an optical projection system to enlarge the image.

Conventionally, there is proposed various types of projection type color television systems of which the principle of the optical system is shown in FIG. 1.

Referring to FIG. 1, the conventional projection type color television system has three cathode ray tubes C1, C2 and C3 for projecting light beams of different primary colors which are normally red, green and blue onto a projecting screen S through respective lens assemblies L1, L2 and L3. Three different color light beams form a proper color picture, when they are projected onto the projecting screen, are required to be mixed with each other upon placing one over the other without any displacements. For accomplishing complete and perfect overlapping of the three different color images, it is necessary to produce the three different color light beams from exactly the same place. However, since it is impossible for the three cathode ray tubes to occupy the same place at the same time, they are aligned side by side to minimize the displacement of the light source between the three different primary colors. According to the conventional projection type color television system, the three cathode ray tubes C1, C2 and C3 are placed equidistantly from the center Cs of the projecting screen S and the cathode ray tube C2 in the center has its light beam projecting face, i.e., the phosphor screen, positioned in parallel relation to the face of the projecting screen S while the two neighboring cathode ray tubes C2 and C3 have their phosphor screens in inclined relation to the face of the projecting screen S. Thus, the axis of the optical path between the cathode ray tube C1 and the projecting screen S, designated by a reference character A1, is inclined by an angle $\alpha$ from the axis of the optical path between the cathode ray tube C2 and the projecting screen S, designated by a reference character A2. Similarly, an axis A3 of the optical path between the cathode ray tube C3 and the projecting screen S is inclined by an angle $\alpha$ from the axis A2.

The lens assemblies L1, L2 and L3 are placed between the respective cathode ray tubes and the projecting screen, equidistantly from the center Cs of the screen S with their axes in alignment with the axes A1, A2 and A3, respectively.

Assuming the optical characteristics of the lens assemblies L1, L2 and L3 are exactly alike each other, then the images on the cathode ray tubes C1, C2 and C3 are projected onto the projecting screen S in the same ratio of enlargement, i.e. magnification.

However, in such type of optical system described above, a normal line erected from the center Cs of the projecting screen S only matches with the axis A2 while the other axes A1 and A3 are in inclined relation to said normal line. Therefore, only the light beam from the cathode ray tube C2 is properly focused onto the projecting screen S. As for the light beam produced from the cathode ray tube C1, the image thereof properly focuses on an imaginary screen S'. Since the imaginary screen S' is inclined by the angle of $\alpha$ from the actual screen S, the image of the light beam projected from the cathode ray tube C1 onto the actual screen S is distorted due to geometrical displacement, particularly at the opposite edges where the actual screen S deflects from the imaginary screen S' in a large degree. Similarly, image formed by the light beam produced from the cathode ray tube C3 would be properly focused on an another imaginary screen S''. Thus, the image focused onto the actual projecting screen S is distorted.

In order to overcome or minimize such distortion in the projected image, as is apparent to those skilled in the art, it is necessary to have the original image on the cathode ray tubes to be geometrically corrected or the three cathode ray tubes C1, C2 and C3 to be positioned at a distance much larger than a distance between the neighboring cathode ray tubes. In practice, such distortion is minimized or eliminated by separating the light source D enough far from the projecting screen S, more than 1 to 2 meters, as shown in FIG. 2.

Therefore, with the conventional type of optical arrangement, not only it is impossible to construct a reasonable size of color television set having the three cathode ray tubes C1, C2 and C3, three lens assemblies L1, L2 and L3 and projecting screen S incorporated in a housing therefor, but also it needs much skill to properly position the cathode ray tubes and the lens assemblies to match the respective optical axes on the center of independently prepared projecting screen S.

Furthermore, in such type of optical system, the geometrical displacement affects an established color picture on the projecting screen S to be blurred and indistinct particularly at the opposite edges due to the projected image being out of focus. In other words, the three different color light beams do not properly overlap or superimpose one over the other.

Although it is possible to accomplish the correction of such blur by replacing the above described lens assemblies with lens assemblies having greater relative aperture, such correction, however, accompanies a decrease in the brightness or luminance in the established color picture.

As a consequence, the optical system of the conventional type shown in FIG. 1, has such disadvantages that the ratio of the distance between the cathode ray tube and the projecting screen to the distance between the neighboring cathode ray tubes, namely distance ratio, is restricted in a certain range, as well as the relative aperture of each lens assembly.

Therefore, it is a primary object of the present invention to provide a projection type color television system which is capable of clear color picture projection.

It is another object of the present invention to provide above described type of color television system in which the optical system requires no precise arrangements.

It is a further object of the present invention to provide above described type of the color television system in which the distance between the projecting screen and the cathode ray tubes are shortened with respect to the distance between the neighboring cathode ray tubes.

It is a still further object of the present invention to provide above described type of color television system in which the available range for the relative aperture is widened to present brighter lens assemblies.

It is yet further object of the present invention to provide above described type of color television system which can be accommodated in a housing as in direct-view type television set.

According to the present invention, the color television system comprises projecting screen means, three cathode ray tubes having their faceplates positioned in parallel relation to the face of the projecting screen means and aligned in an imaginary line parallel to the horizontal scanning direction of the image and three lens assemblies each provided between the cathode ray tubes and the projecting screen means with their principal planes positioned in parallel relation to the face of the projecting screen means. In establishing the color picture on the projecting screen means with the optical arrangement of the present invention, three independent color images projected from the three cathode ray tubes geometrically coincide with each other, so that the established color picture do not contain any picture distortion due to the geometrical displacement of the three color images. Furthermore, each image projected from the cathode ray tube properly focuses on the actual screen S, so that the projected image particularly at the opposite edges do not result in "out of focus". Thus, the lens having aperture ratio in large amount is available for the optical system of the present invention.

The present invention further comprises circuit means coupled to each of the cathode ray tubes for correcting the intensity of the light beam by increasing the intensity at the peripheral edges of the projected picture, so that the established picture on said projecting screen perceived with the eyes has uniform brightness. Such brightness correction not only uniforms the brightness of the established color picture, but also balances the chrominance of the three different primary colors.

Furthermore, the projecting screen means of the present invention comprises two layers of diffuser members which are a layer of diffuser plate member and a layer of lenticular lens member. The diffuser plate member has at least one surface thereof finished through matting, so that the light beam diffused by the diffuser plate member scatters in all directions, but intensively in a direction perpendicular to the diffuser plate member. On the other hand, the lenticular lens member has at least one surface thereof formed with a plurality of furrow-like grooves, so that the light beam diffused by the lenticular lens member scatters mainly in one direction such as horizontal direction and scarcely scatters in vertical direction. By combining these two layers, the diffused light beam from the projecting screen means is directed mostly towards the surroundings of said projecting screen means where the observers are situated, and not towards upwards and downwards of the projecting screen means.

These and other objects of the present invention will become apparent from the following description taken in conjunction with preferred embodiment thereof with reference to the accompanying drawings, and it is to be noted that like parts are designated by like reference numerals for the present invention through out the drawings, wherein;

FIGS. 1 and 2 are schematic views showing optical arrangement of the projection type color television system of conventional type which has been already referred to;

Figure 10:
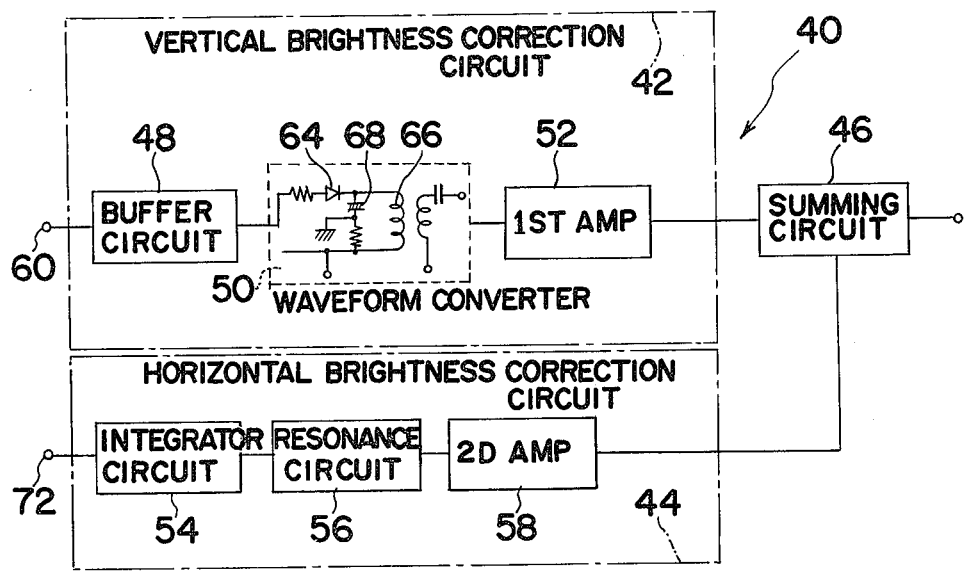
FIG. 10 is a block diagram of a brightness correction circuit.
Figure 12:
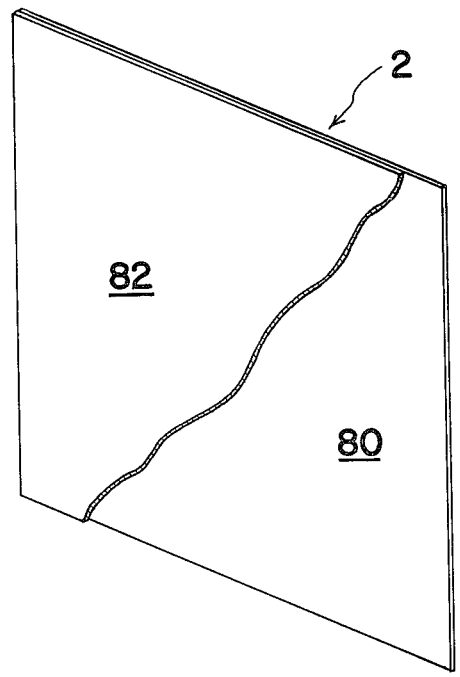
Figure 13:
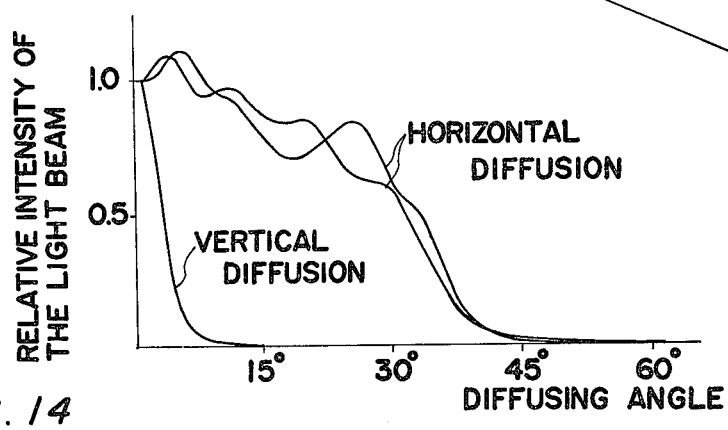
Figure 14:
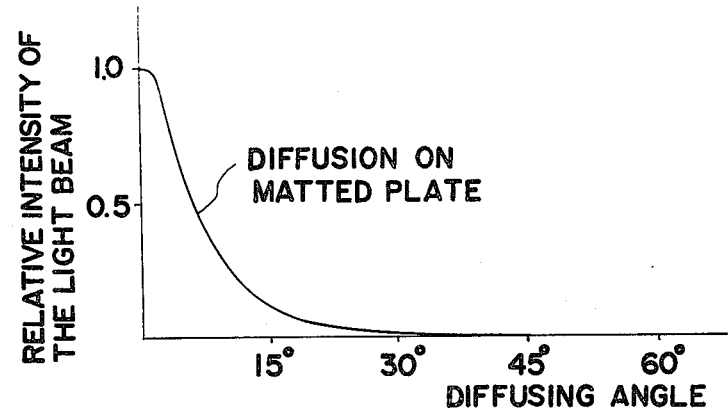
Figure 15A:
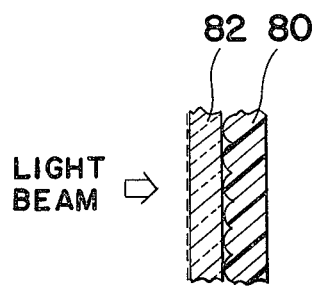
Figure 15B:
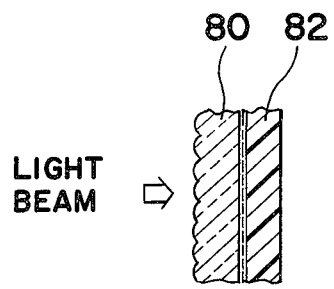
Figure 16:
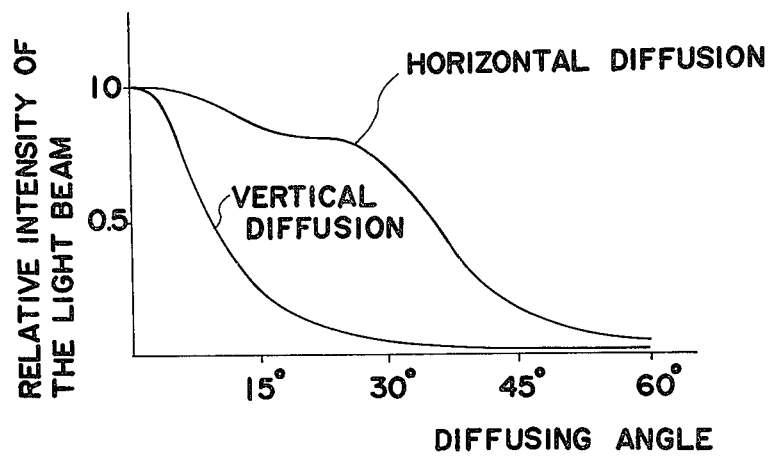

FIGS. 11(a), 11(b), 11(c), 11(d), 11(e) and 11(f) are waveforms to be seen in various points in the brightness correction circuit shown in FIG. 10;

FIG. 12 is a perspective view of a projecting screen partly broken;

FIGS. 13 and 14 are graphs showing relative intensity of the diffused light beam by the lenticular lens member and the mat finished diffuser plate member, respectively;

FIGS. 15(a) and 15(b) are fragmentary sectional views of the projecting screen shown in FIG. 12; and FIG. 16 is a graph showing relative intensity of the diffused light beam by the projecting screen shown in FIG. 12.

Figure 3:
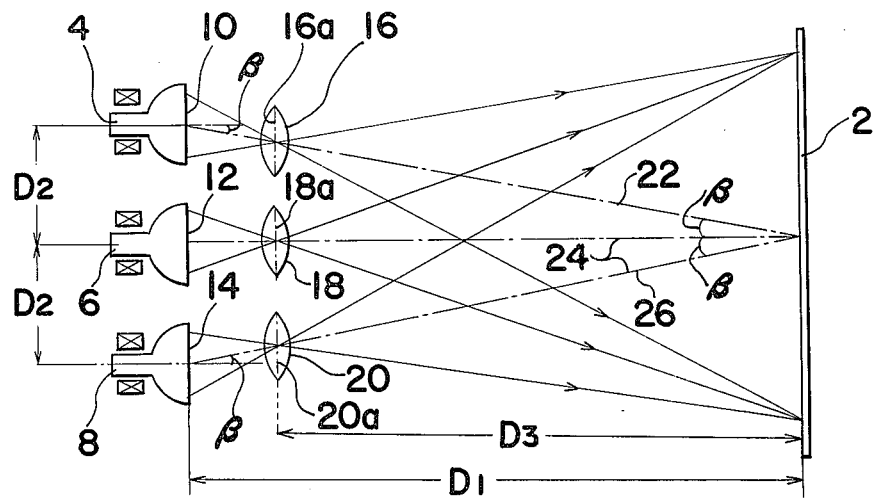
FIG. 3 is a schematic top plane view of an optical arrangement of the projection type color television system of the present invention.

Referring to FIG. 3, there is shown a principle of the optical arrangement of the projection type color television system of the present invention.

The optical arrangement comprises a projecting screen 2, three cathode ray tubes 4, 6 and 8 and three lens assemblies 16, 18 and 20 each provided between the projecting screen 2 and the respective cathode ray tubes.

Before the description of the structure of the projecting screen 2 proceeds, the optical arrangement of the projection type color television system of the present invention is described first. Each of the three cathode ray tubes 4, 6 and 8 has glass faceplate or phosphor screen designated by the reference numerals 10, 12 and 14 adapted to project onto the projecting screen 2 different one of three primary color light beams containing image information. For example, the three cathode ray tubes 4, 6 and 8 may produce color light beams of red, green and blue, respectively. The three cathode ray tubes 4, 6 and 8 are provided in such a manner that their glass faceplates or phosphor screens are positioned in parallel relation to the face of the projecting screen 2 and the respective phosphor screen are separated from the face of the projecting screen 2 in a predetermined distance D1 and that the neighboring cathode ray tubes are separated from each other by a distance D2 and the phosphor screen are positioned in alignment with an imaginary line parallel to the horizontal scanning direction of the light beam.

It should be noted that the optical axis for the light beam projected from each of the cathode ray tubes, coincides with a line extended between the center of the respective phosphor screen and the center of the projecting screen 2. Therefore, chain lines designated by the reference numerals 22, 24 and 26 are optical axes for the light beams projected from the cathode ray tubes 4, 6 and 8, respectively.

The three lens assemblies 16, 18 and 20, each represented by a single lens for the brevity of the drawing, are provided in such a manner that their principle planes designated by the reference numerals 16a, 18a and 20a, are positioned in parallel relation to the face of the projecting screen 2 and the respective principle planes 16a, 18a and 20a are separated from the face of the projecting screen 2 in a predetermined distance D3.

It is needless to say that the center of each lens assemblies 16, 18 and 20 coincides with the optical axes 22, 24 and 26, respectively.

With such optical arrangements described above where the lens characteristics of the lens assemblies 16, 18 and 20 are alike each other, the ratio of the enlargement of the projected image in different colors results in the same enlargement ratio, i.e., magnification, so that the projected image of each color light beam geometrically matches with the images of other color light beams. Thus, disregarding the aberration of the lens assemblies 16, 18 and 20, the projected images in three different colors on the projecting screen 2 are properly superimposed one over the other to reproduce a reasonable color picture having no disadvantageous geometrical displacement nor blur.

Accordingly, in such optical arrangement, the allowances for the distances D1 and D2 can be ranged to a larger extent than the conventional optical arrangement, since the distance change in either of the distances D1 and D2 may not affect the geometrical displacement between the projected images in different colors.

Furthermore, since the three planes, first plane including the phosphor screens of the three cathode ray tubes, second plane including principal planes of the lens assemblies and third plane including the projecting screen face, are in parallel relation to each other, the proper focusing planes for the different color light beams projected form the three cathode ray tubes coincide with each other on the third plane including the projecting screen face. Therefore, in the optical arrangement shown in FIG. 3, the lens assemblies having the relative aperture in comparatively high range are available. According to the experiments carried out by the inventors, the lens assemblies applied in the optical arrangement of the present invention were able to accommodate as bright as $f$/stop of 2.0, whereas those applied in the conventional optical arrangement were able to accommodate $f$/stop of 2.8, in obtaining the same reasonable color picture perceived with the eyes, under the conditions in which the magnification of the lens assemblies being six and diagonal distance of the screen being 750 m/m with the same projecting distance.

Therefore, the brightness of the projected color picture on the screen in the optical arrangement of the present invention is twice as bright as those in the conventional type.

Figure 1:
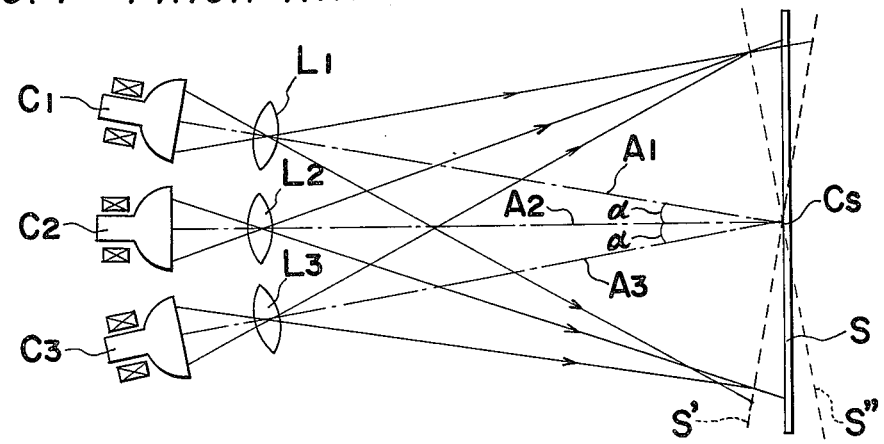
Figure 2:
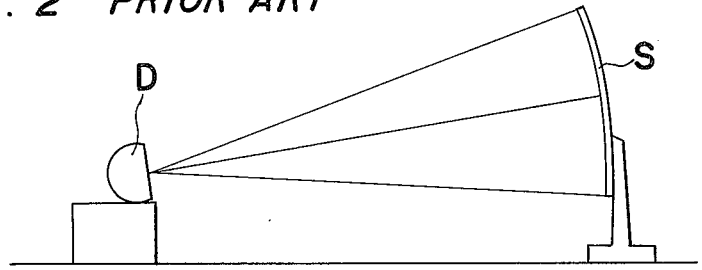

As is apparent from the foregoings that the optical arrangement of the present invention shown in FIG. 3 is superior to that shown in FIG. 1 from the view point of brightness, i.e., luminance. However, the optical arrangement of the present invention may have a problem in an irregularity in the established color picture projected on the screen when the three color images are to be mixed.

The description is now had to such problem and to means for correcting the problem.

Still referring to FIG. 3, the optical axis 22 for the light beam projected from the cathode ray tube 4 is inclined by an angle of $\beta$ from the optical axis 24. Likewise, the optical axis 26 is inclined toward the other side by an angle of $\beta$ from the optical axis 24. Hence, the light beams projected from the cathode ray tubes 4 and 8 and gathered by the respective lens assemblies 16 and 20 are inclined by the angle of $\beta$ from the axes of respective cathode ray tubes 4 and 8.

Figure 4:
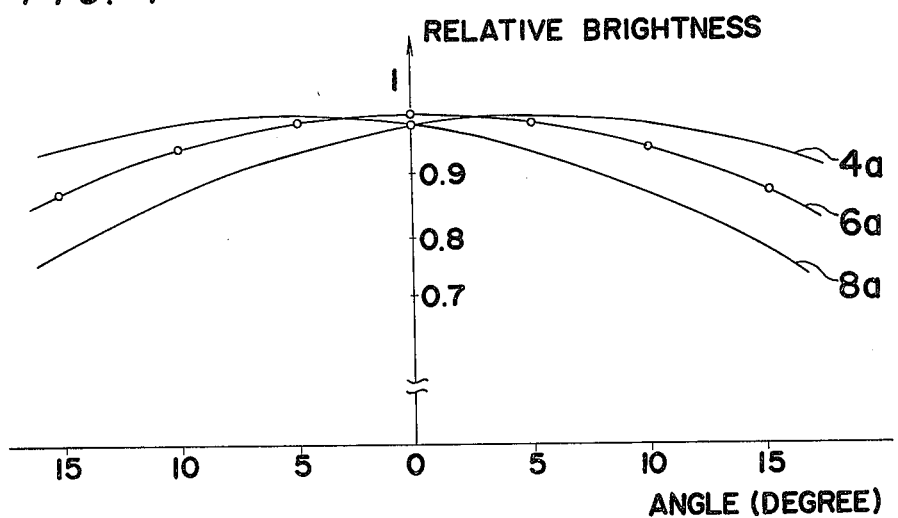
FIG. 4 is a graph showing relative brightness of the three different primary colors projected onto the screen before being corrected.

Suppose that the image on the phospher screen of each cathode ray tube has uniform brightness and perfectly been diffused, and that each lens assembly has the relative aperture of unity and has equal spectral transmittance for the three colors. Under such condition, the brightness of the image on the projecting screen 2 becomes deflected in such a manner to decrease the brightness as the image depart from the axis of each lens assembly. Upon defining the brightness of the image projected form the cathode ray tube 6 on the projecting screen 2 at the center thereof as unity, the relative brightness of the image on the screen 2 is equal to $\cos^4\theta$, wherein $\theta$ is an angle of light beam emitted from the lens assembly. Such relation is known as cosine of the fourth power of the angle. Accordingly, the relative brightness of the image on the projecting screen 2 without brightness correction is given in a graph shown in FIG. 4, in which the abscissa represents emission or projection angle and the ordinate represents relative brightness. The curves given by the reference numerals 4a, 6a and 8a show the relative brightness of the images projected from the cathode ray tubes 4, 6 and 8, respectively on the projecting screen 2, provided that the $\beta$ is 5.5°. Such deflection in the brightness can be corrected through a suitable correction in a signal applied to each of the cathode ray tubes.

Figure 5:
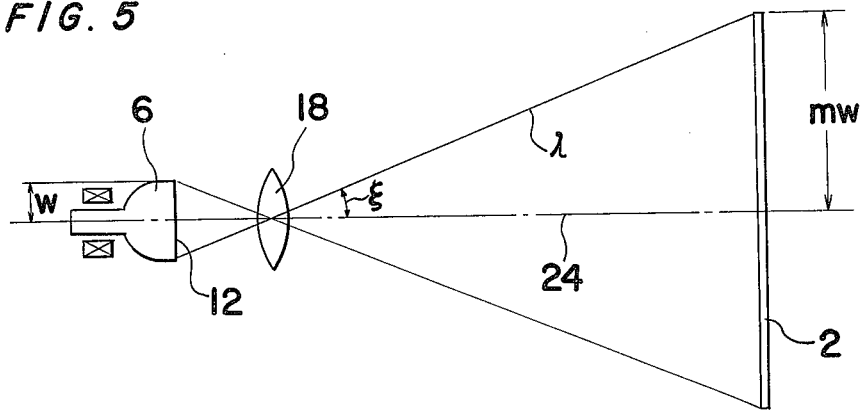
FIGS. 5 and 6 are schematic top plane view and said elevational view of the optical arrangement shown in FIG. 3, respectively, but only showing one cathode ray tube.
Figure 6:
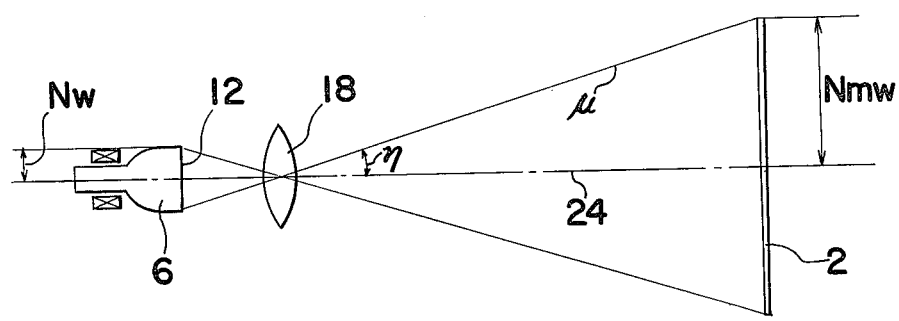
Figure 7:
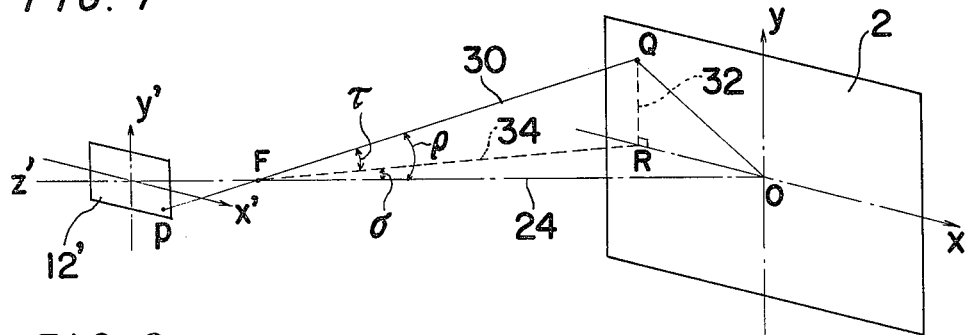
FIG. 7 is a schematic perspective view of the optical arrangement shown in FIGS. 5 and 6.

Before the description for such correction proceeds, it is first described the cosine of the fourth power of the angle in connection with FIGS. 5, 6 and 7 for better understanding of the manner how the brightness correction is carried out.

Referring to FIGS. 5 and 6, there are shown schematic top plane view and side elevational view, respectively, of the projection television system, in which the cathode ray tubes 4 and 8 together with their lens assemblies 16 and 20 are eliminated for simplifying the drawings.

The reference characters used in FIGS. 5 and 6 are defined as follows;

$w$ — half the length of the glass faceplate of the cathode ray tube measured horizontally, $\lambda$ — a light beam projected to the most horizonally deflected edges on the projected screen 2, $\xi$ — an angle formed by the optical axis 24 and the light beam $\lambda$, $m$ — magnification of the lens assembly 18

$mw$ — half the length of the projecting screen measure horizontally, $N$ — aspect ratio for the phosphor screen of the cathode ray tube, $Nw$ — half the length of the phosphor screen measured vertically, $\mu$ — light beam projected to the most vertically deflected edges on the projecting screen 2, $\eta$ — an angle formed by the optical axis 24 and the light beam $\mu$, $Nmw$ — half the length of the projecting screen 2 measured vertically.

In general, the relation between a brightness of a light source defined as Eo and a brightness of an image defined as E projected onto a projecting screen is given as following equation (1).

$$E = Eo \cos^4\theta \quad (1)$$

wherein $\theta$ is the angle defined by the light beam and the optical axis as described above. Upon application of the equation (1) into the optical arrangement shown in FIGS. 5 and 6, the equation (1) can be rewritten as equations (2) and (3) as follows;

$$E1 = E10 \cos^4\xi \quad (2)$$

$$E2 = E20 \cos^4\eta \quad (3)$$

wherein E10 and E20 are brightness of a small area on the phosphor screen 12 corresponding with the light beams $\lambda$ and $\mu$, respectively, while E1 and E2 are brightness on the projecting screen 2 where light beams $\lambda$ and $\mu$ are projected, respectively.

In comparing the equation (1) with the equations (2) and (3), it is understood that the $\theta$ in the equation (1) designates the angle formed between the optical axis and the actual light beam, whereas $\xi$ and $\eta$ in the equations (2) and (3), respectively, designate the angle formed between the optical axis and horizontally and vertically viewed light beam of the actual light beam, respectively.

Since the illumination on the phosphor screen 12 of the cathode ray tube 6 is carried out by scanning the electron beam in horizontal and vertical direction, it is preferable in accomplishing the brightness correction to divide the actual light beam into horizontally viewed light beam and vertically viewed light beam, as shown in FIG. 7.

Referring to FIG. 7, there is shown a perspective view of the optical arrangement shown in FIGS. 5 and 6, wherein F designates a center of the lens assembly 18, and 12' designates a face of the phosphor screen 12 on which there is provided a scale having coordinates of X' and Y' axes with optical axis coinciding with a Z' axis. A light beam 30 emitted from any given small area or a point P on the phosphor screen face 12' travels through the lens center F and is projected onto the projecting screen 2 at a given small area or a point Q to form the image thereon. It should be noted that the projecting screen 2 is also scaled with coordinates of X and Y axes with their zero points matching with a center 0 of the projecting screen 2. A line extended from the point Q onto the X axis at a point R in perpendicular relation is given by a reference numeral 32 and a line extended between the lens center F and the point R is given by a reference numeral 34. By defining the angle between the lines 30 and 24 as $\rho$, angle between the lines 34 and 24 as $\sigma$, and angle between the lines 30 and 34 as $\tau$, the relation between the brightness at the point P, defined as Ep, and at the point Q defined as Eq can be given as follows, $$Eq = Ep \cos^4\rho \quad (4)$$

since $$\cos\rho = \overline{FO}/\overline{FQ} \quad (5)$$

$$\cos\sigma = \overline{FO}/\overline{FR} \quad (6)$$

$$\cos\tau = \overline{FR}/\overline{FQ} \quad (7)$$

it is obtained that $$\cos\rho = \cos\sigma \cdot \cos\tau \quad (8)$$

Therefore, it is possible to rewrite the equation (4) as $$Eq = Ep \cos^4\sigma \cdot \cos^4\tau \quad (9)$$

From the equation (9), it is understood that the equation (4) can be given by a product of X' and Y' axial components.

The light beam emitted from the phosphor screen face 12' at the uttermost edge on the X' axis forms the image on the projecting screen 2 at the uttermost edge opposite to the former edge on the X axis, as shown in FIG. 5, while the light beam emitted from the phosphor screen face 12' at the uttermost edge of the Y'axis forms the image on the projecting screen 2 at the uttermost edge opposite to the former edge on the Y axis, as shown in FIG. 6.

As is apparent from the lens formula, $\cos\xi$ and $\cos\eta$ can be expressed as $$\cos\xi = (m+1) f/\sqrt{(mw)^2 + (m+1)^2 f^2} \quad (10)$$

$$\cos\eta = (m+1) f/\sqrt{(Nmw)^2 + (m+1)^2 f^2} \quad (11)$$

wherein $f$ is a focal length of the lens assembly.

According to the foregoings, it is understood that the brightness on the projecting screen will become even by correcting the amplitude of the horizontally and vertically scanning signals by multiplying by $1/\cos^4\tau$ and $1/\cos^4\tau$, respectively.

Figure 8:
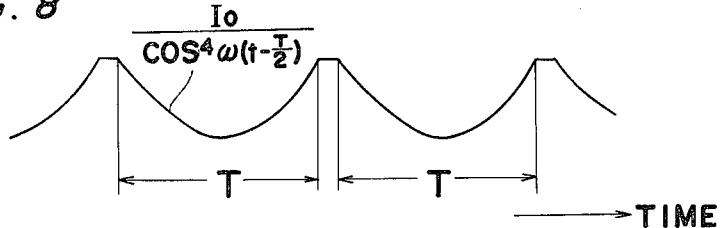
FIGS. 8 and 9 are waveforms of horizontal and vertical brightness signal to be supplied to the cathode ray tube, respectively.

Referring to FIG. 8, there is shown a corrected waveform for a horizontal brightness signal to be supplied to the cathode ray tube, in which the reference character T designates the horizontal scanning time and the relation between the time $t$ and the intensity of the brightness $I_1$ can be given as;

$$I_1 = Io/\cos^4\omega(t-(T/2)) \quad (12)$$

wherein Io is the minimum brightness appearing along the X axis and $\omega$ is a phase given hereinbelow.

$$\omega = (T/2) \cos^{-1}(m+1)f/\sqrt{(m+1)^2f^2 + m^2w^2} \quad (13)$$

Figure 9:
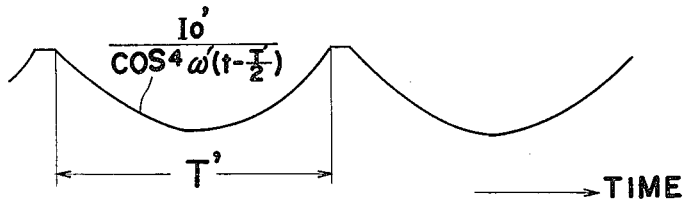

Referring to FIG. 9, there is shown a corrected waveform for a vertical brightness signal to be supplied to the cathode ray tube in which the reference character T' designates the vertical scanning time and the relation between the time $t$ and the intensity of the brightness $I_2$ can be given as;

$$I_2 = Io'/\cos^4\omega'(t-(T'/2)) \quad (14)$$

wherein Io' is the minimum brightness appearing along the Y' axis and $\omega'$ is a phase given hereinbelow.

$$\omega' = (2//T') \cos^{-1}(m+1)f/\sqrt{(m+1)^2f^2 + N^2m^2w^2} \quad (15)$$

Such brightness correction is obtained by a correction circuit coupled to the cathode ray tube.

Referring to FIG. 10, the correction circuit 40 comprises a vertical brightness correction circuit 42, a horizontal brightness correction circuit 44 and a summing circuit 46 which is connected to the vertical and horizontal brightness correction circuits 42 and 44. The vertical brightness correction circuit 42 comprises a buffer circuit 48, waveform converter 50 and first amplifier 52 which are connected in series and the horizontal brightness correction circuit 44 comprises an integrator circuit 54, a resonance circuit 56 and a second amplifier 58 which are connected in series.

Figure 11A:
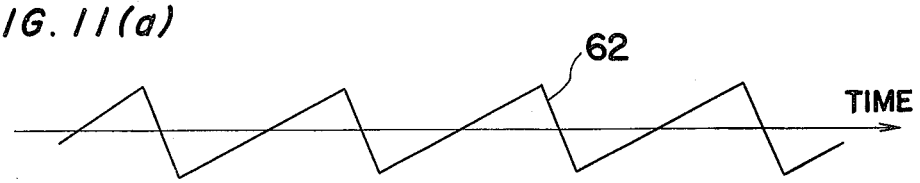
Figure 11B:
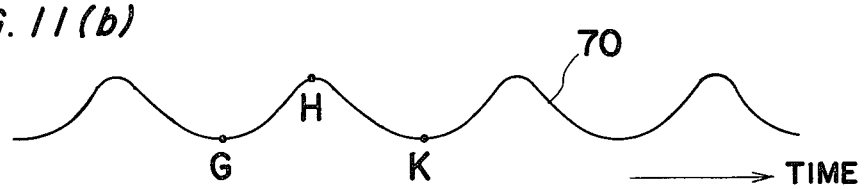

A vertical deflection current signal 62 having sawtooth waveform as shown in FIG. 11(a) is applied to an input terminal 60 of the vertical brightness correction circuit 42 and to the waveform converter 50, through the buffer circuit 48. The waveform converter 50 comprises a diode 64, a reactance transformer 66 coupled to the diode 64 and a capacitor 68 connected across the primary side of the transformer 66. When the first half cycle which corresponds with the upper half of the sawtooth wave 62 flows through the diode 64 towards the reactance transformer 66, the signal is integrated and converted into paraboloidal waveform 70 at a section between the reference characters G and H, as shown in FIG. 11(b).

During the current flow of the first half cycle, the capacitor 68 is also charged with the same current flowing through the diode 64. In the next half cycle which corresponds with the lower half of the sawtooth wave, the diode 64 is turned into non-conductive state, whereby the charged voltage in the capacitor 68 is discharged through the reactance transformer 66. Thus the discharging current is integrated and converted, in the reactance transformer 66, into the paraboloidal wave 70 at a section between the reference characters H and K. Hence, one complete cycle of the sawtooth wave is converted into one complete cycle of the paraboloidal wave.

Figure 11C:
Figure 11D:
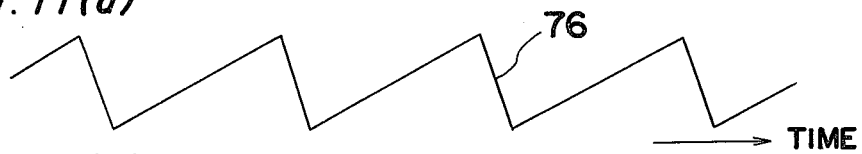
Figure 11E:
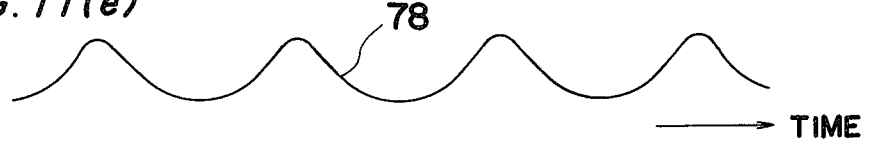

Applied to an input terminal 72 is a horizontal deflection current signal 74, as shown in FIG. 11(c), which is first converted into sawtooth wave 76 as shown in FIG. 11(d) by the integrator circuit 54 and then further converted into a quasi-paraboloidal wave 78 as shown in FIG. 11(e) by the resonance circuit 56 for resonating with a horizontal deflection frequency.

Figure 11F:
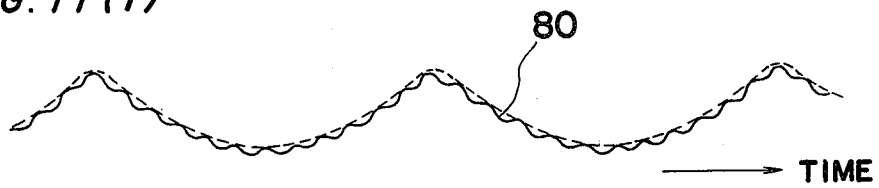

The signals obtained from the first and second amplifiers are combined in the summing circuit 46 to generate a combined corrected brightness signal 80 therefrom, as shown in FIG. 11(f). The combined signal 80 is supplied to a brightness control circuit (not shown) for controlling the relative brightness on the phosphor screen to change the horizontal and vertical brightness distribution paraboloidally. Therefore, the image projected on the projecting screen 2 has the relative brightness in even intensity over the entire surface thereof.

It should be noted that the lens assembly described as composed of one lens can be replaced by a lens assembly having a plurality of lenses, as in most of the cases. In such lens assembly, the ratio of the peripheral light intensity to the central light intensity in projected image, so-called aperture efficiency becomes much severe then single lens to darken the peripheral images on the projecting screen 2. However, such deflection in the light intensity, i.e., the brightness can be easily corrected in the similar manner. As is expressed in the equation (9), the correction can be separately carried out in the vertical brightness deflection and in the horizontal brightness deflection. For correcting the horizontal brightness deflection on the projecting screen 2, first, the phosphor screen of the cathode ray tube is so arranged as to produce a uniform light beam in the horizontal scan along the X' axis. Then, the reciprocal of a formula obtained from the distribution curve is applied to the horizontal brightness correction circuit whereby the image along the X axis is corrected to present an event brightness. It is needless to say that the vertical brightness deflection is corrected in the similar manner.

In the case where it is difficult to obtain the distribution curve, the correction is carried out through the measurement of only the brightness at the opposite edges on the projecting screen where the light beams λ and μ shown in FIGS. 5 and 6 are projected. Such edge brightness are compared with the equations (10) and (11), respectively, to take their ratios R and R'. These ratios are then applied to the first and second amplifiers 48 and 54 shown in FIG. 10 to increase the amplitude of the paraboloidal waves shown in FIGS. 11(b) and 11(e).

According to the experiments carried out by the inventors, such a simple correction is proved to be satisfactory since the brightness deflection is corrected to become uniform within a variation of ± 5%.

Although the foregoings is particularly directed to the brightness correction of the particular color image formed by the cathode ray tube 6, other color images formed by the cathode ray tubes 4 and 8 are also corrected to present uniform brightness entirely on the projecting screen 2 through the similar manner described above. Therefore, detail descriptions for the brightness correction of the images formed by the cathode ray tubes 4 and 8 are omitted.

Since the color picture thus formed on the projecting screen 2 has each particular color image properly focused on the projecting screen 2 and exactly overlapping on the other color images, there are no deteriorations such as blur being seen in the established color picture. Furthermore, the uniform brightness in each color image not only contributes to provide the established color picture in the uniform brightness but also to provide well-balanced chrominance among three different primary colors over the entire color picture.

In the optical arrangement described above, the projecting screen 2 of the present invention comprises, as shown in FIG. 12, a layer of a lenticular lens 80 and a layer of a diffuser plate 82. The lenticular lens 80 is, for example formed by a plate made of vinyl chloride having a thickness of 0.3 mm and having formed on one surface with a lenticular furrows having a lens pitch of 0.254 mm, a curvature radius of 0.134 mm and the refractive index of 1.58.

With such type of lenticular lens 80, the light beam projected thereon diffused differently with respect to horizontal and vertical diffusing directions. In horizontal directions, the light beam diffuses in a wide range which is determined by the lens pitch and the focal length. On the other hand, in vertical directions, the light beam diffuses in a narrow range or hardly diffuses, as shown in graph of FIG. 13.

Referring to FIG. 13, the graph thereof shows the intensity of the diffused light beam both in horizontal and vertical directions, in which graph the abscissa and the ordinate represent the diffusing angle and the relative intensity of the light beam, respectively.

The diffuser plate 82 is, for example formed by a thin layer such as 0.117 mm thick plate made of trioxidized cellulose having at least one surface thereof finished through matting in a known manner. Such diffuser plate 82 itself has a diffusing characteristics as shown in a graph of FIG. 14, in which graph the abscissa and the ordinate represent the diffusing angle and the relative intensity of the light beam, respectively.

It should be noted that the projecting screen 2 described as having the diffuser plate 82 lying over the lenticular lens 80 can be prepared in opposite way, that is, the lenticular lens 80 lying over the diffuser plate 82, and yet obtaining the same effect.

When laying the diffuser plate 82 over the lenticular lens 80 or in the opposite way, it is found out by the present inventors that the lenticular lens 80 face having lenticular furrows, as well as the matted face of the diffuser plate 82, should preferably face the direction where the light beam is coming, i.e., towards the cathode ray tubes for efficiently diffusing the light beam, as shown in FIGS. 15(a) and 15(b).

According to such projecting screen arrangement, the range for the light beam diffused in horizontal direction is mainly determined by the layer of the lenticular lens 80 while the range for the light beam diffused in vertical direction is mainly determined by the layer of the diffuser plate 82. Since the viewing angle for an observer to watch television may range, for example, ± 30° in horizontal direction and ± 15° in vertical direction from the center of the screen, the projecting screen 2 of the present invention is so arranged as to diffuse the light beam in wide angle in horizontal direction and to diffuse the light beam in narrow angle in vertical direction. Thus, the diffused light beam mainly directs towards observers who are around the projecting screen 2. Such diffusing characteristics is shown in a graph of FIG. 16, in which the abscissa and the ordinate represent the diffusing angle and the relative intensity of the light beam, respectively.

It should be noted that the projecting screen 2 of the present invention can be formed in a reflection type screen or in a transmission type screen.

It should also be noted that the diffuser plate 82 described as made of trioxidized cellulose can be replace by a ground glass for use in building materials.

Although the present invention has been fully described by way of examples with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A projection type color television system comprising:
   a. projecting screen means;
   b. three cathode ray tubes for projecting a color picture on said projecting screen means, each of said three cathode ray tubes having a phosphor screen for producing and projecting onto said projecting screen means a different one of the three primary colors of a light beam containing image information in said beam, said three cathode ray tubes being positioned to have respective phosphor screens placed on a first imaginary plane in a parallel relation to said projecting screen means and in alignment with each other along a first imaginary line parallel to a horizontal scanning direction of said light beam; and
   c. three optical lens means, each provided in front of said phosphor screen and between said projecting screen means and said cathode ray tube for focusing said beam on said projecting screen means, said three optical lens means being positioned to have respective principle planes on a second imaging plane in a parallel relation to said projecting screen means, and in alignment with each other along a second imaginary line which is parallel to said first imaginary line, said lens means being positioned such that the center of said phosphor screen of each cathode ray tube, the center of corresponding lens means and the center of said projecting screen means are in alignment with each other.

2. A projection type color television system as claimed in claim 1, wherein said projecting screen means have diffuser means for diffusing projected light beam in wide range in a direction parallel to said imaginary line and in narrow range in a direction perpendicular to said imaginary line.

3. A projection type color television system as claimed in claim 2, wherein said diffuser means has two layers which comprises;
   a. a layer of diffuser plate member having at least one surface thereof finished through matting for diffusing light beam projected thereon in all directions; and
   b. a lenticular lens member placed over said diffuser plate member for narrowing the diffusing light beam in horizontal direction.

4. A projection type color television system as claimed in claim 3, wherein said diffuser plate member has the matted surface facing said phosphor screen, said lenticular lens having the lens surface which faces said phosphor screen.

5. A projection type color television system as claimed in claim 1, further comprising brightness control means coupled to each of said three cathode ray tubes for controlling the light intensity of said beam produced from said phosphor screen so as to have vertical and horizontal brightness distribution in high brightness at opposite side edges of said phosphor screen and in low brightness at the center of said phosphor screen, whereby projected image on said projecting screen perceived with eyes has uniform brightness.

6. A projection type color television system as claimed in claim 5, wherein said control means controls the intensity of said beam in horizontal and vertical brightness distribution on said phosphor screen to be proportional to values of $1/\cos^4\sigma$ and $1/\cos^4\tau$, respectively, in which values $\sigma$ designates an angle formed between an optical axis perpendicularly penetrating through the center of said phosphor screen and a line which is a projected line of a line extended between any point in said phosphor screen and the center of said lens means on an imaginary horizontal surface including said optical axis, and $\tau$ designates an angle formed between formed between said optical axis and a line which is a projected line of a line extended between any point in said phosphor screen and the center of said lens means on an imaginary vertical surface including said optical axis.

7. A projection type color television system as claimed in claim 6, wherein said projecting screen means have diffuser means for diffusing projected light beam in wide range in a direction parallel to said imaginary line and in narrow range in a direction perpendicular to said imaginary line.

8. A projection type color television system as claimed in claim 7, wherein said diffuser means comprises;
   a. a layer of diffuser plate member having at least one surface thereof finished through matting for diffusing light beam projected thereon in all directions; and
   b. a lenticular lens member placed over said diffuser plate member for narrowing the diffusing light beam in horizontal direction.

9. A projection type color television system as claimed in claim 8, wherein said diffuser plate member has the matted surface facing said phosphor screen, said lenticular lens having the lens surface which faces said phosphor screen.

* * * * *